UNITED STATES PATENT OFFICE.

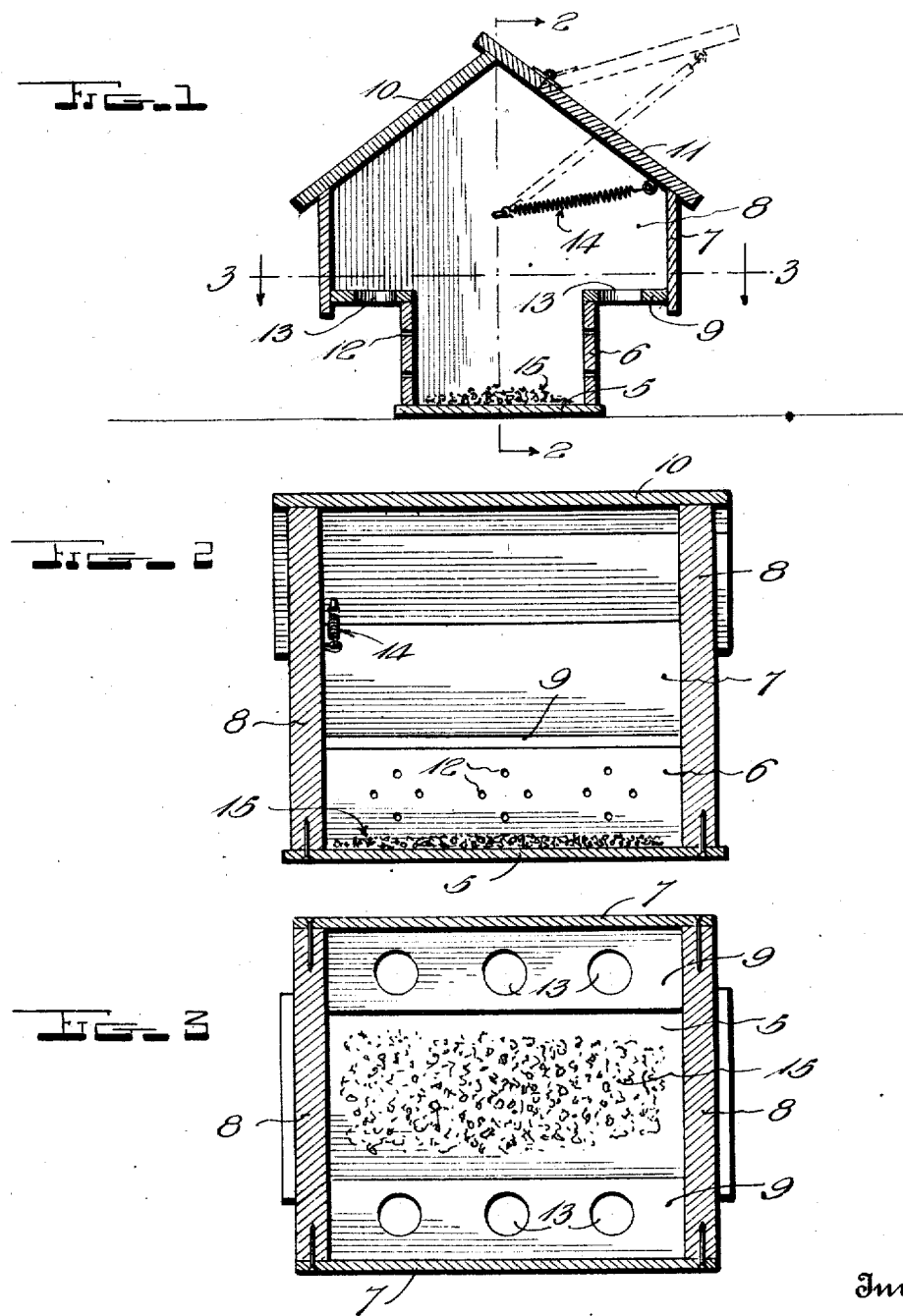

HENRY EDWARD YOUNG, OF ELIZABETHTOWN, KENTUCKY.

POISON-HOLDER AND DECOY FOR RODENTS.

1,325,069.    Specification of Letters Patent.    Patented Dec. 16, 1919.

Application filed April 3, 1919. Serial No. 287,283.

*To all whom it may concern:*

Be it known that I, HENRY E. YOUNG, a citizen of the United States, residing at Elizabethtown, in the county of Hardin and State of Kentucky, have invented certain new and useful Improvements in Poison-Holders and Decoys for Rodents; and I do declare the following to be a full, clear, and exact description of the invention, such as will enable others skilled in the art to which it appertains to make and use the same.

This invention relates to an improved poison holder and decoy for rodents.

One object of the invention is to provide an improved poison holder which will permit rats, mice and animals of a similar nature to have access to the poison or poisoned food contained therein, while excluding domestic animals, fowls and children from access to the poisoned food.

Another object is to provide a device of this character which will allure and decoy rats and other rodents, because of its peculiar construction and shape.

Other objects and advantages may become apparent to persons who read the following details of description in connection with the accompanying drawings in which:

Figure 1 is a central vertical sectional view of my improved poison holder and decoy.

Fig. 2 is a vertical sectional view along the line 2—2 of Fig. 1.

Fig. 3 is a horizontal sectional view along the line 3—3 of Fig. 1.

Referring to these drawings in detail, in which similar reference characters correspond with similar parts throughout the several views, my improved animal decoy comprises a receptacle having a bottom 5, lower walls 6, upper walls 7, gable walls 8, horizontal plates 9, a roof or cover section 10 and a hinged cover section 11.

The lower walls 6 are apertured at 12, and the horizontal plates 9 are apertured at 13. Below the plates 9, a sufficient space is provided for the animal, which is sought to be decoyed, to enter, and the apertures or vertical holes 13 are of sufficient size to allow such animal to pass therethrough to the interior of the receptacle.

A spring 14 has one end secured to one of the gables 8, while its other end is secured to the hinged section 11 of the cover. This spring normally holds the cover section 11 down or in its closed position, and this spring is preferably sufficiently strong to prevent a young child from raising the cover section 11. However, an older or stronger person may raise the cover section and place the poison upon the floor 5. At 15 is represented a quantity of poison or poisoned food, and the odor of the food passes through the openings 12 and attracts or allures the rodents toward the receptacle. When the rodent has reached the receptacle, and finds that food is contained therein and that the apertures 12 are too small for it to pass through, it naturally and easily discovers the openings 13, these being directly above and near to the eyes of the rodent when its nose is near the openings 12. It is also according to the nature of a rodent to venture upward through a hole, knowing that if danger is encountered on the other side of the member containing the hole, it can quickly drop by gravity out of danger's way. Therefore, when the rodent has projected its head upward through one of the openings 13, and encountered no danger, it ventures farther and finally reaches the poisoned food. As the poisoned food is entirely inclosed, and the rodent feels quite safe and secure, it freely partakes of the poisoned food, and is soon fatally affected thereby.

From the foregoing it will be seen that I have provided a very efficient and yet comparatively simple and inexpensive means for exterminating rodents and other animal pests, at the same time safeguarding domestic animals and children.

Although I have described this embodiment of my invention very specifically, it is not intended to limit my invention to these exact details of construction and arrangement of parts, but I am entitled to make changes within the scope of the inventive ideas disclosed in the foregoing description and following claims.

What I claim as my invention is:

1. An animal decoy and poison holder comprising a receptacle having a floor, a lower wall extending up from the floor, a horizontally and outwardly extending vertically apertured plate on said lower wall and providing a sufficient space thereunder to receive the animal sought to be decoyed, an upper wall on the part of the horizontal plate outward of the apertures of the latter, and a cover on said upper wall, the apertures of said plate being sufficiently large to permit the animal to pass from the exterior to the interior of the receptacle.

2. An animal decoy and poison holder comprising a receptacle having a floor, a lower wall extending up from the floor and provided with perforations therethrough, a horizontally and outwardly extending vertically apertured plate on said lower wall and providing a sufficient space thereunder to receive the animal sought to be decoyed, an upper wall on the part of the horizontal plate outward of the apertures of the latter, and a cover on said upper wall, the apertures of said plate being sufficiently large to permit the animal to pass from the exterior to the interior of the receptacle, the said perforations being so small that the animal cannot pass therethrough.

3. An animal decoy and poison holder comprising a receptacle having a floor, lower walls extending up from the floor and provided with perforations therethrough, horizontally and outwardly extending vertically apertured plates on said lower walls and providing a sufficient space thereunder to receive the animal sought to be decoyed, upper walls on the parts of the horizontal plates outward of the apertures of the latter, a cover on said upper walls and comprising a hinged section, and a spring for yieldingly holding the hinged section in its closing position, the apertures of said plates being sufficiently large to permit the animal to pass from the exterior to the interior of the receptacle.

In testimony whereof I have hereunto set my hand.

HENRY EDWARD YOUNG.